United States Patent
Hu et al.

(10) Patent No.: US 12,463,895 B1
(45) Date of Patent: Nov. 4, 2025

(54) SYSTEMS AND METHODS FOR STREAMLINED TOPOLOGY UPDATES FOR DISTRIBUTED DATA STORAGE

(71) Applicant: Stripe, Inc., South San Francisco, CA (US)

(72) Inventors: Yufei Hu, Foster City, CA (US); Hemal Mukeshkumar Shah, Sunnyvale, CA (US); Alexandre Desjardins, Verdun (CA); Shashi Madappa, Campbell, CA (US); David Albertson, Bellevue, WA (US); Karan Vohra, Sammamish, WA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 18/653,564

(22) Filed: May 2, 2024

(51) Int. Cl.
  *H04L 45/42* (2022.01)
  *H04L 41/12* (2022.01)
  *H04L 45/036* (2022.01)

(52) U.S. Cl.
  CPC .............. *H04L 45/42* (2013.01); *H04L 41/12* (2013.01); *H04L 45/036* (2022.05)

(58) Field of Classification Search
  CPC ....... H04L 45/22; H04L 45/036; H04L 45/28; H04L 45/04; H04L 45/24; H04L 12/4633; H04L 45/38; H04L 45/02; H04L 45/42; H04L 45/64
  See application file for complete search history.

(56) References Cited

U.S. PATENT DOCUMENTS

| | | | |
|---|---|---|---|
| 7,457,277 B1* | 11/2008 | Sharma | H04L 45/02 370/395.51 |
| 7,844,733 B2* | 11/2010 | Betts | G06F 40/143 709/241 |
| 11,405,296 B1* | 8/2022 | Evans | H04L 41/147 |
| 12,001,694 B1* | 6/2024 | Murthy | G06F 3/0604 |
| 2004/0190502 A1* | 9/2004 | Sharma | H04Q 3/54583 370/360 |
| 2011/0236013 A1* | 9/2011 | Gazzola | H04J 14/0271 398/5 |
| 2014/0075557 A1* | 3/2014 | Balabine | H04L 41/069 709/201 |
| 2014/0177634 A1* | 6/2014 | Jiang | H04L 45/74 370/392 |
| 2014/0307556 A1* | 10/2014 | Zhang | H04L 45/302 370/236 |
| 2019/0021043 A1* | 1/2019 | Youn | H04W 12/06 |
| 2019/0109780 A1* | 4/2019 | Nagarkar | H04L 45/247 |

(Continued)

*Primary Examiner* — Ninos Donabed
(74) *Attorney, Agent, or Firm* — Womble Bond Dickinson (US) LLP

(57) ABSTRACT

A method and system for updating a topology on router nodes in a distributed storage system are described. The method can include obtaining, by a first service of a control plane service, topology information from an inventory data store by querying a second service of the control plane service that manages the inventory data store for the topology information. The method can further include generating, by the first service of the control plane service, a topology payload based on the obtained topology information. The method can also include sending, by the first service of the control plane service, a request comprising the topology payload to a router node.

14 Claims, 8 Drawing Sheets

(56) References Cited

U.S. PATENT DOCUMENTS

| | | | |
|---|---|---|---|
| 2021/0367867 A1* | 11/2021 | Arora | H04L 45/50 |
| 2023/0124663 A1* | 4/2023 | Bahnasy | H04L 45/08 370/254 |
| 2023/0401072 A1* | 12/2023 | Rajamanickam | H04L 45/02 |
| 2024/0281265 A1* | 8/2024 | Rajamanickam | H04L 45/54 |
| 2024/0380686 A1* | 11/2024 | Meo | H04L 45/16 |

\* cited by examiner

SYSTEMS AND METHODS FOR STREAMLINED TOPOLOGY UPDATES FOR DISTRIBUTED DATA STORAGE

BACKGROUND

Service provider systems provide various services to user systems over computing networks. The services provided can include commercial transaction processing services, media access services, customer relationship management services, data management services, medical services, etc., as well as a combination of such services. Modern computing techniques employed by many service provider systems typically involve deploying the functions of the service provider systems as distributed services. That is, each service may be responsible for a discrete set of functions, and the services and associated functions operate autonomously or in conjunction with one another as a whole to provide the overall functionality of a service provider system. By dividing the overall functionality of service provider systems in this way, the services may be distributed to different computing systems, multiple instances of the same services used concurrently, etc. to adapt to system load, network connectivity issues, instances of services going down, as well as other technical challenges with implementing distributed service provider systems.

In each of the above service provider systems, users of a service provider system typically interact with the service provider system via messaging over a computing network. For example, a user may make transmit an electronic request message for one of many types of services supported by the service provider system. Then, the one or more of the services of the distributed service provider system will perform functions of the service provider system to implement the originally requested service requested by the user. For example, the service request message may be a media access service request, a telecommunications service request, a financial processing service request, etc., and one or more services of the service provider system are invoked to process the user's request.

During each of the operations performed by the service provider system to processes the user's service request, the services of the service provider system may generate and store, or seek to access stored, data associated with the service, the user, or other data. The data may include data associated with fraud detection services, bookkeeping services, record keeping services, regulatory services, end user data, service system data, third party system data, as well as other data that may be generated or accessed during the overall processing of the service system request. The service provider systems may receive and process millions, billions, or more service system requests per hour, day, week, etc., resulting in an enormous scale of data generation and access operations of the services of the service provider system.

Generally, the data described above is stored in distributed cache data stores of the service provider system. The scale of data accesses by the service provider system requires a current and accurate topology of the distributed cache data stores. A topology can be understood as a link between a stateless router cluster of the service provider system and a stateful data cluster of the service provider system. The topology typically includes a topology configuration that enables a router cluster to determine where data is stored among the distributed cache data stores. The topology configuration is generally read by a router node to direct the flow of data traffic to a data node. Unfortunately, updating topologies on router nodes is a static, laborious, manual, error-prone, and slow process of pushing out code changes to LUA files (e.g., repository memrouter-lua).

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
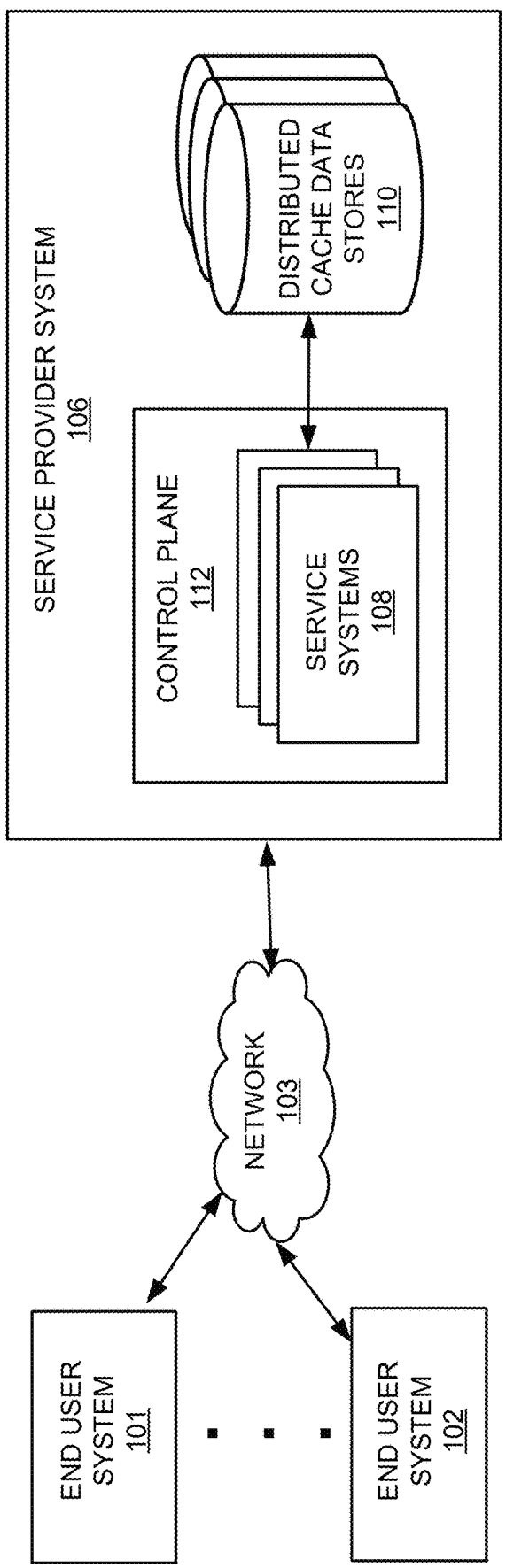
FIG. 1 is a block diagram of a system architecture for a service provider system according to an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining", "generating", "sending", "querying", "receiving", "extracting", "validating", "storing", "updating", "initiating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Embodiments of the disclosure address the challenge of automating a topology update process in a quick, less error-prone, user-friendly, and distributed manner. The topology update process can be run as a standalone operation, or as a subsidiary operation as part of a larger workflow. Embodiments of the disclosure may involve using a command line interface (CLI) tool (which may be referred to as memento-control-cli), a control plane service (e.g., Memento™ control plane service or system), and a sidecar service (e.g., Memento™ memcar) running on both router nodes and data nodes (e.g., Memento™ data nodes).

In some embodiments, the topology update process can facilitate the creation, listing, and deletion of topologies between router clusters and data clusters (e.g., Memento™ data clusters) through using the CLI tool. Additionally, the process can serve as a foundational building block for horizontal and vertical scaling of the data clusters, recycling of the data clusters, and repairing of faulty data nodes. The data stored within a data cluster can be replicated multiple times (e.g., three times) across multiple availability zones in the same region (e.g., three availability zones), ensuring each availability zone contains a complete copy. Embodiments of the disclosure also maintain a high availability of a data cluster as the control plane service can dynamically coordinate a faulty node replacement and re-route data traffic via performing a topology update based on predefined rules.

According to some embodiments, a method and system for updating a topology on router nodes in a distributed storage system are described. The method can include obtaining, by a first service of a control plane service, topology information from an inventory data store by querying a second service of the control plane service that manages the inventory data store for the topology information. The method can further include generating, by the first service of the control plane service, a topology payload based on the obtained topology information. The method can also include sending, by the first service of the control plane service, a request comprising the topology payload to a router node.

In an embodiment, the method can further include: receiving, by a first service of the router node, the request comprising the topology payload; extracting, by the first service of the router node, the topology payload from the request; validating, by the first service of the router node, the extracted topology payload to determine whether the extracted topology payload is valid; in response to determining that the extracted topology payload is valid, storing, by the first service of the router node, the extracted topology payload as a topology configuration file; and sending, by the first service of the router node, a command to a second service of the router node, the command causing the second service of the router node to update a topology configuration of the second service of the router node based on the topology configuration file.

In an embodiment, the method can further include: in response to receiving the command, obtaining, by the second service of the router node, the topology configuration file; and updating, by the second service of the router node, the topology configuration of the second service of the router node based on the topology configuration file.

In an embodiment, the method can further include: sending, by the first service of the router node, a response to the first service of the control plane service, the response indicating a successful update of the topology configuration of the second service of the router node.

In an embodiment, the method can further include: in response to receiving the response, initiating, by the first service of the control plane service, a workload test to validate an end-to-end data flow from the router node to one or more data storage nodes.

FIG. 1 is a block diagram of a system architecture for a service provider system according to an embodiment. Referring to FIG. 1, in an embodiment, system architecture 100 includes, but not limited to, service provider system 106 and one or more end user systems 101-102. In an embodiment, the end user system(s) 101-102 may be mobile computing devices, such as a smartphone, tablet computer, smartwatch, etc., as well computer systems, such as a desktop computer system, laptop computer system, server computer systems, etc. The service provider system 106 and the end user system(s) 101-102 may also be one or more computing devices, such as one or more server computer systems, desktop computer systems, etc.

The embodiments discussed herein may be utilized by a plurality of different types of service provider systems, such as commerce platform systems including payment processing systems, card authorization systems, banks, and other systems seeking to perform streamlined topology updates on distributed router nodes of service provider system 106, as discussed in greater detail below. Furthermore, any system seeking to store data in a distributed fashion and perform topology updates, such as medical information systems, customer relationship management systems, media storage and distribution systems, etc. may use and/or extend the techniques discussed herein to perform streamlined topology updates. However, to avoid obscuring the embodiments discussed herein, the operations and techniques for streamlined topology updates in a distributed storage system may use examples of a service provider system to illustrate and describe the embodiments of the present disclosure, and are not intended to limit the application of the operations and techniques described herein from applicability to other systems.

With continued reference to FIG. 1, the service provider system 106 and end user system(s) 101-102 may be coupled to a network 103 and communicate with one another using any of the standard protocols for the exchange of information, including secure communication protocols. In an embodiment, one or more of the service provider system 106 and end user system(s) 101-102 may run on a local area network (LAN) and may be incorporated into the same physical or logical system, or different physical or logical systems. Alternatively, the service provider system 106 and end user system(s) 101-102 may reside on different LANs, wide area networks (WANs), cellular telephone networks, etc. that may be coupled together via the Internet but separated by firewalls, routers, and/or other network devices. In an embodiment, service provider system 106 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

As an example, service provider system 106 may provide financial processing services to one or more merchants, such as end user system(s) 101-102. For example, service provider system 106 may manage merchant accounts held at the commerce platform, run financial transactions initiated at end user system(s) 101-102, clear transactions, performing payouts to merchant and/or merchant agents, manage merchant and/or agent accounts held at the service provider system 106, as well as other services typically associated with commerce platforms systems. Each of these functions may be carried out by one or more service system(s) 108 of the service provider system 106. That is, service provider system 106 may divide the services it provides to end users among one or more service system(s) 108, so that the processing of the services may be distributed. Such distribution of service processing enables service provider systems to scale based on load, demand, hardware issues, geographic needs, expanded service offerings, as well as for other reasons.

In some embodiments, end user system(s) 101-102 may access the services of service provider system 106 by network based messaging, such as application programming interface (API) based messaging where remote calls of end user system(s) 101-102 request a service by messaging the request to one or more of the service systems 108. The service systems 108 in turn, and in order to execute the requested service, may generate messages to other service systems 108, generate data associated with the requested service that is stored in distributed cache data store(s) 110, access data stored in distributed cache data store(s) 110 that is needed to process the requested service, or a combination of such operations. Thus, each requested service operation generates, stores, accesses, write, deletes, modified, or otherwise interacts with data stored at the distributed cache data store(s) 110. Furthermore, such data may originate from the end user system(s) 101-102 (e.g., user supplied data) and/or may be data associated with a requested service that is generated by a service system 108 (e.g., service generated/supplied data).

Service provider system 106 may provide numerous services to end user systems(s) 101-102. For example, where service provider system 106 is a commerce platform, the services may include running financial transactions for merchant end users, managing agent accounts of merchants, performing tax accounting services as a result of the various financial transactions, performing data control and management of merchant data, providing platform hosting services, and any other such services. Each of these services may be initiated at the request of an end user system 101 or 102, by another service system 108, or a combination thereof. Furthermore, end user system(s) 101-102 may include a plurality of end user systems(s) that as a whole invoke the services of server system(s) 108 on a scale of millions, hundreds of millions, billions, or more service transactions per hour, day, etc. Therefore, the amount of data generated by the service systems(s) 108 is very large, and the number of data accesses by the service systems 108 is also very large. Because of this scale, in some embodiments, service provider system 106 may employ a distributed data storage system that utilizes in-memory cache data, illustrated as distributed cache data store(s) 110.

In some embodiments, distributed cache data store(s) 110 is cache memory of a distributed data storage system, such as a Memento™ data storage system. The distributed cache data store(s) 110 is/are cache storage where data accesses (e.g., data being generated and stored, read, overwritten, etc.) are processed from the distributed cache data store(s) 110. In some embodiments, the distributed cache is a pool of random access memory (RAM) of multiple physical resources (e.g., computing systems that implement the service systems 108) that serves as an in-memory data store to provide fast access to the data stored within the distributed cache data store(s) 110. Furthermore, the use of a cache data storage system reduces network bandwidth consumption, as data accesses are performed directly with cache memory, and not as calls/responses to/from remote database systems. For systems, such as service provider system 106 that operates at scale, the use of distributed cache data store(s) 110 to manage data accessed by the service systems 108 is therefore both beneficial to end user system(s) 101-102 and service systems 108 as data access requests may be handled more quickly and used less network bandwidth.

As will be discussed in greater detail below, the volume of data stored by distributed cache data store(s) 110 and the scale of data accesses by the service systems 108 require a current and accurate topology of the distributed cache data store(s) 110. The topology, as discussed below, includes a topology configuration that enable router nodes to determine where data is stored among distributed cache data store(s) 110. The topology can be understood as a link between a stateless router cluster of the service provider system 106 and a stateful data cluster of the service provider system 106. The current and accurate topology therefore serves to ensure data access requests (e.g., reads, writes, etc.) do not fail and return accurate data. Data access requests made against old or outdated topologies may delay services of the service provider system 106 (e.g., when a requested service is delayed and/or rejected), cause data inconsistencies (e.g., where a data access is executed against an old or inaccurate topology), and otherwise harm the operations of the service provider system 106. Therefore, in order to ensure the distributed cache data store(s) 110 topology is current and accurate and can be updated in a quick, less error-prone, user-friend, and distributed manner, embodiments discussed herein provide for a streamlined topology update process for a distributed data storage system.

In an embodiment, control plane 112 may serve to manage cluster operations within the distributed cache data stores 110 while also serving as an interface layer that validates each request from service systems 108 and maintains inventory and relationships between components of the distributed cache data stores 110. For example, a user or operator may interface with control plane 112 to perform provisioning, de-provisioning, scaling, recycling, or health monitoring of the distributed cache data stores 110. The control plane 112 may streamline the processes of provisioning and de-provisioning router and data node clusters, horizontal and vertical scaling of router and data node clusters, recycling router and data node clusters, and health monitoring of the router and data node clusters. Control plane 112 may manage distributed cache stores 110 in an efficient manner that maintains data integrity of the distributed cache data stores 110.

Additionally, control plane 112 may provide automated primary zone failover, (e.g., from a first availability zone to a second availability zone), or automatically orchestrate the replacement of faulty cluster components (e.g., a faulty router node or data node), or automatically conduct data path synthetic tests. Operations that are said to be automatically performed may include operations performed by a processing device without input or a prompt from a human operator.

Figure 2:
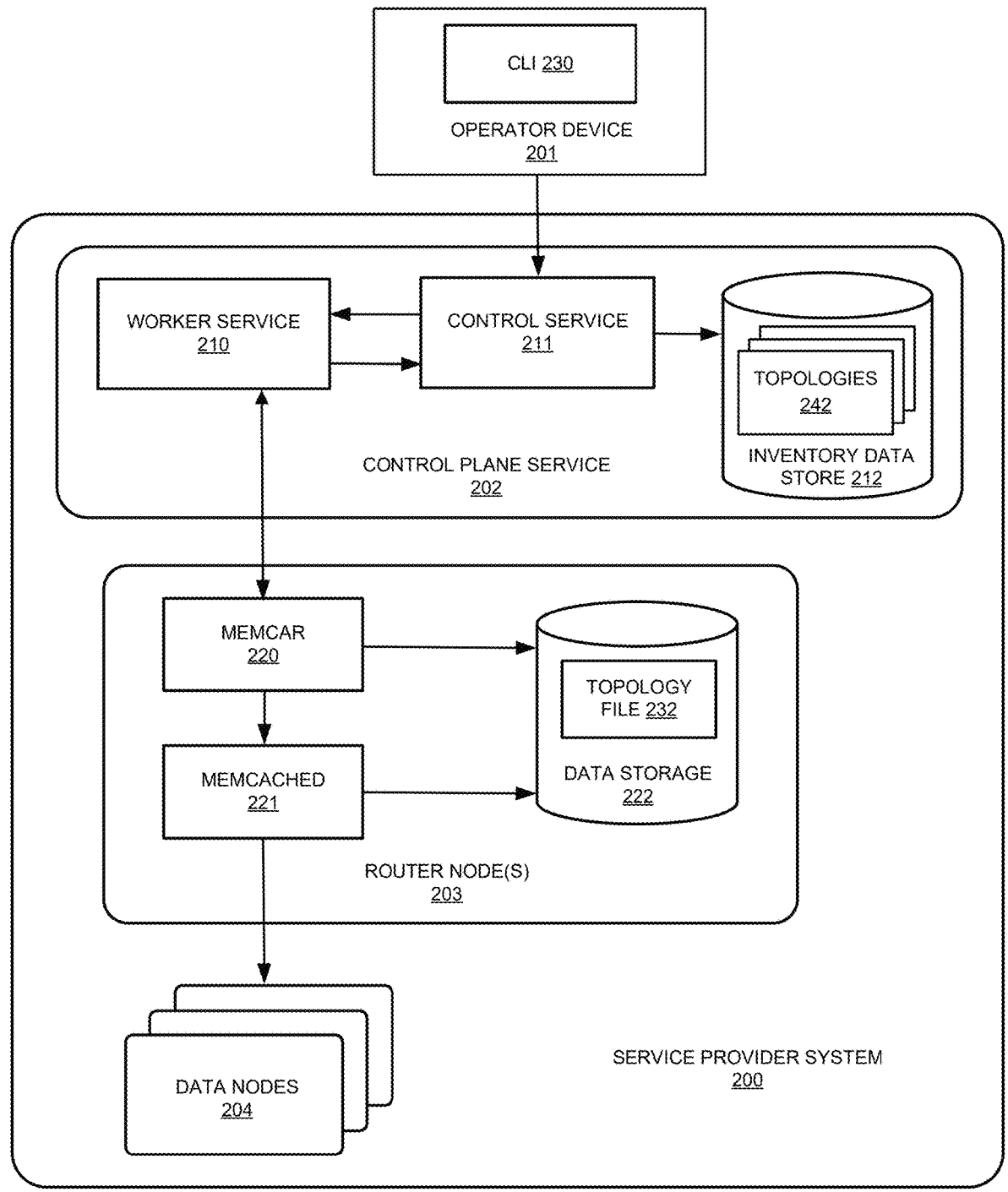
FIG. 2 is a block diagram of an operator device operating with a service provider system to perform a topology update according to an embodiment.

FIG. 2 is a block diagram of an operator device operating with a service provider system to perform a topology update according to an embodiment. In FIG. 2, operator device 201 may operate or interact with service provider system 200 to launch a topology update process or workflow on the service provider system 200. The operator device 201 may be coupled to the service provider system 200 over a network (e.g., network 103 of FIG. 1 or another network) and may communicate with the service provider system 200 using any of the standard protocols for the exchange of information, including secure communication protocols. The operator device 201 may be a mobile computing device (e.g., a smartphone, tablet computer, smartwatch, etc.), or a computer system (e.g., a desktop computer system, laptop computer system, server computer system, etc.). Service provider system 200 provides additional details for the service provider system 106 discussed above in FIG. 1.

In an embodiment, operator device 201 may include a CLI tool 230 (which may be referred to as memento-control-cli) installed thereon to invoke the topology update workflow. In another embodiment, a graphical user interface (GUI) tool (not shown) may be installed on the operator device 201 to invoke such process or workflow. When the CLI tool 230 is run, it may execute a script to generate and send a CLI command that includes a topology update request, such as a high-performance remote procedure call (gRPC) request. The command may also be a command to create or remove a connection between a particular router cluster and a specific data cluster that in turn launches the topology update workflow.

In an embodiment, service system provider 200 includes a control plane service 202, one or more router nodes 203, and one or more data nodes 204 (which may also be referred to as data storage nodes). Control plane service 202 may be an example embodiment of control plane 112 of FIG. 1. The control plane service 202 (which may also be referred to as a control plane) may be implemented with a dual service architecture that includes a worker service 210 and a control service 211, as shown in FIG. 2. Worker service 210 and control service 211 may be executed on a physical machine, or virtual machine executed by a physical machine, having its own computing system hardware, such as one or more processors, memories, network interfaces, and other hardware typically associated with network enabled computing devices. In an embodiment, control plane service 202 may utilize Kubernetes containers and temporal workflows to manage operations for a distributed caching platform.

Control plane service 202 may service requests from a user of operating device 201 (or another computing device) to operate create, read, update, or delete (CRUD) operations on a distributed cache data store (e.g., distributed cache data store 110 of FIG. 1). Control plane service 202 may provision new caching clusters, individual components of the caching infrastructure (a router node 203 or data node 204), perform updates or upgrades on already deployed infrastructure, deprovision clusters or individual components, or trigger caching related operations, for example, router reconfiguration, cache warming, node replacement, scaling up, or scaling down of a cluster.

As shown in FIG. 2, control plane service 202 may serve as an access and management layer for distributed cache data stores (e.g., distributed cache data stores 110) formed from database clusters. Each cluster may include one or more routers nodes 203 which are associated with one or more data nodes 204. The router nodes 203 may be referred to as stateless router nodes. The data nodes 204 may be referred to as stateful data nodes (e.g., Memento™ nodes).

A stateless router may use static routes that are configured ahead of time (e.g., pre-configured) as opposed to dynamic configuration. Stateless routers do not maintain state. Stateless routers may include processing logic (e.g., software and/or hardware) that forward packets over the network to the proper destination. They may send a request to the server and relay the response back without storing any information. Stateful refers to maintaining context about the current state or past operations associated with the respective cluster while stateless refers to being agnostic about a current state or past operations of the cluster.

Data nodes 204 may be nodes of in-memory RAM of the physical resources used to implement the services, routers, etc. of service provider system 200, and are part of one or more computing centers (e.g., web services computing systems, cloud computing systems, etc., such as Amazon Web Services™ (AWS), Google Cloud™, IBM Cloud™, Microsoft Azure™, etc.) at which the services and routers are implemented, etc. Furthermore, in some embodiments, the data nodes 204 may further include logic to respond to and execute data access requests, for example carrying out data access operation and replying to the services originating the requests.

As shown, the control plane service 202 may use an inventory data store or database 212 (e.g., AWS Aurora PostgreSQL) for persistent storage. The inventory data store 212 may be coupled to the control service 211. The inventory data store 212 may include topology or topologies 242 of a cluster. The topology or topologies 242 may include the most recent topology to be used for updating the topology configuration of router node(s) 203, as will be discussed in greater detail below. For each topology 242, inventory data store 212 may include database schemas for storing topology information that includes an association between a router cluster (e.g., router node(s) 203) and a data cluster (e.g., data node(s) 204), and topology-related information for each data node 204 that includes a consistency mode, a caching read-write mode, an identifier for a primary instance, a topology order (e.g., a shard index), and/or a status of the topology (e.g., active or inactive). The association between the router cluster and the data cluster may include router identifiers of router nodes (e.g., router nodes 203). The association may further include IP addresses, host names, host sets, etc. of data nodes (e.g., data nodes 204) associated with each router node. The IP addresses may define the locations of the data nodes. The association between the router cluster and the data cluster (e.g., Memento™ cluster) and the topology-related information may be stored in the same dedicated data structure (e.g., a table) or in separate data structures (e.g., tables). In an embodiment, the data structure may include a topology version number to enable continuous monitoring of each router cluster's topology versions. This facilitates a separate service (or cron) running with the control plane service 202 to periodically evaluate and push topology updates to router node(s) 203 that do not possess the latest topology version.

As previously described, the control plane service 202 includes two components: control service 211 (which may be referred to also as memento-control-srv) and worker service 210 (which may be referred to as memento-temporal-worker-srv). Each of the worker service 210 and control service 211 may include its own dedicated set of compute resources (e.g., processing threads, memory, etc.). Control plane service 202 may be deployable as a package (e.g., a software package) to a particular region.

In operation, an operator (e.g., human operator) can initiate the topology update workflow by issuing a CLI command that includes a topology update request (e.g., gRPC request) to the control service 211 via the CLI tool 230. In response to the command, the control service 211 may trigger the worker service 210 to launch the topology update workflow. The worker service 210 may obtain or fetch the most recent topology 242 having the latest topology information from inventory data store 212 by querying the control service 211 (which may serve as the frontend service of control plane service 202). The control service 211 may have sole access to inventory data store 212 through a data access layer, and thus, may have sole control in storing and managing the topology or topologies 242. Based on the obtained topology information of the most recent topology, the worker service 210 may generate or construct a topology payload that includes the topology information. The worker service 210 may also validate the structure and semantics of the topology payload, then transmit the payload via a request (e.g., gRPC request) to a memcar service 220 running on router node(s) 203. The memcar service 220 can be understood as a dedicated service that receives requests and performs the requested router node operation (e.g., a read, write, health check, etc.).

Upon receiving the request, the memcar service 220 may extract and validate the content of the received topology payload. If it is determined that the extracted topology payload is valid, memcar service 220 may write the topology payload to data storage 222 as a topology configuration file 232. The topology configuration file 232 may be in a format that memcached service 221, operating on router node(s) 203, can effectively process. Memcached service 221 is responsible for maintaining a data store and executing data accesses to the data within the store in response to requests. Data storage 222 may be implemented using one or more persistent storage devices, such as a hard disk drive (HDD), solid state drives (SSD), flash memory device, etc., or a combination of those devices.

Once the topology configuration file 232 is stored or recorded on data storage 222, memcar service 220 may send a command (e.g., a signal hang up (SIGHUP) command) to memcached service 221, causing memcached service 221 to read the topology configuration file 232 from data storage 222, and reload or update its current topology configuration to the new topology configuration from the topology configuration file 232. The memcar service 220 may then communicate back to the worker service 210 a response (e.g., gRPC response) indicating a successful update of the topology configuration of the memcached service 221. In an embodiment, the response may include an OK status code that signals or indicates the successful accomplishment of the topology update operation on the router node(s) 203.

Upon receiving the response from memcar service 220, worker service 210 may initiate a synthetic workload test, which will be described in greater detail below, to validate an end-to-end data flow from the router node(s) 203 to the data node(s) 204. The synthetic workload test would eliminate the need for an intensive and time-consuming testing process that is manually executed by a human operator. Upon completion of the synthetic workload test, worker service 210 may send a response to control service 211 indicating a successful completion of the test.

To facilitate concurrent repairing, recycling, or scaling of different data clusters without obstructing topology update processes on the same set of associated router clusters, status transitions of data nodes (e.g., data nodes 203) and topology lifecycle management can be implemented within a control plane service (e.g., control plane service 202) to force a valid status of a topology snapshot of any data cluster at any given point in time.

Figure 3:
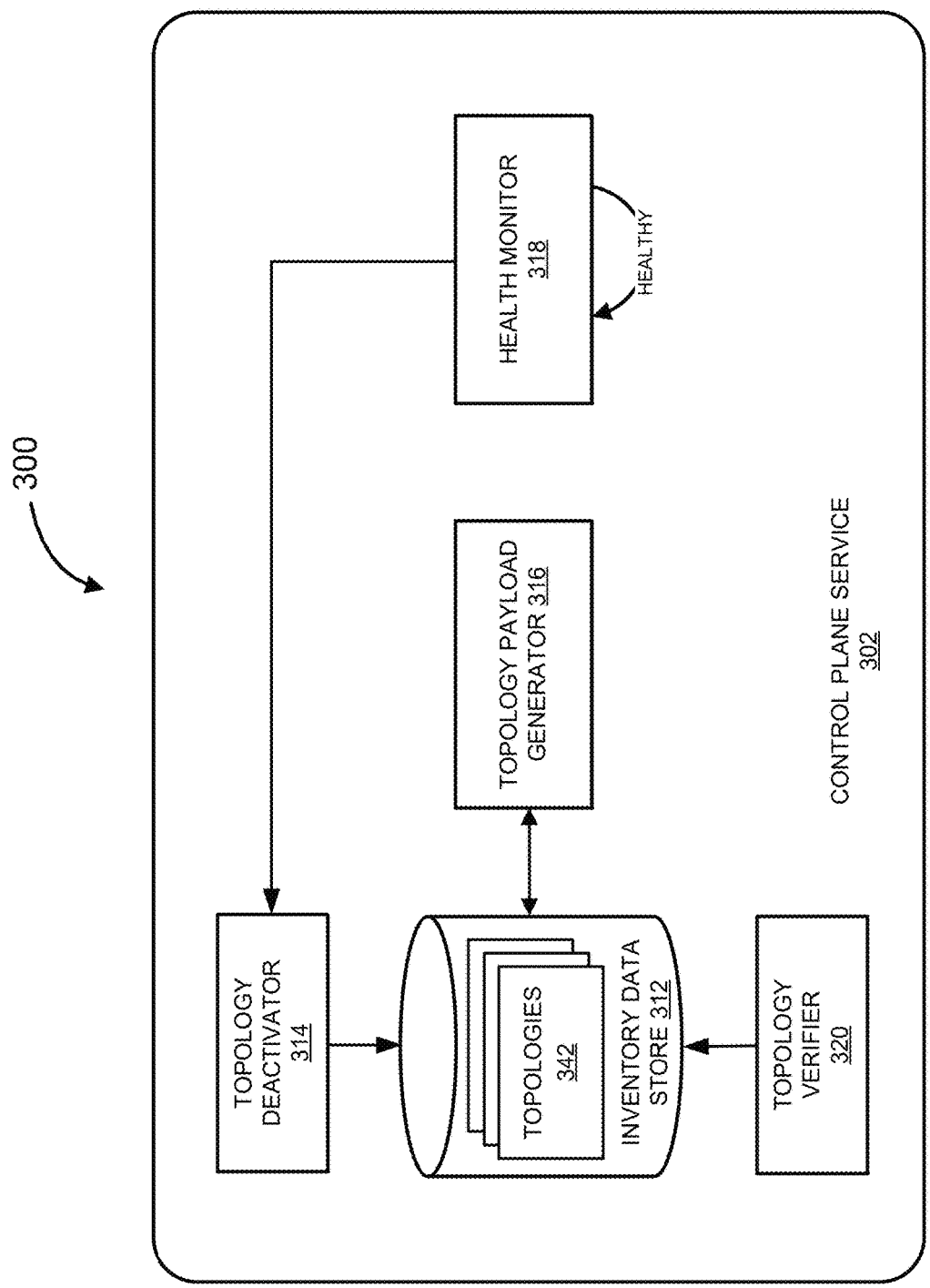
FIG. 3 is a block diagram of status transitions of data nodes and a topology lifecycle management in a control plane service according to an embodiment.

FIG. 3 is a block diagram of status transitions of data nodes and a topology lifecycle management in a control plane service according to an embodiment. Referring to FIG. 3, control plane service 302 may include an inventory data store or database 312 having topology or topologies 342, a topology deactivator 314, a topology payload generator 316, a health monitor 318, and a topology verifier 320. Topology deactivator 314, topology payload generator 316, health monitor 318, and topology verifier 320, in embodiments, are performed by processing logic that may comprise hardware (circuitry, dedicated logic, etc.), software (such as is run on a general purpose computer system or a dedicated machine), firmware, or a combination thereof. Topology deactivator 314, topology payload generator 316, health monitor 318, and topology verifier 320 may be implemented as part of a worker service of control plane service 302 (e.g., worker service 210 of FIG. 2), though they may be implemented as separate services of the control plane service 302.

When a new data node (e.g., Memento™ node) is added to a data cluster, topology verifier 320 may verify, from inventory data store 312, the existence of an inactive topology 342 within the same host set (e.g., router nodes and data nodes) and/or the absence of an active topology 342 at an identical topology order. If this condition is satisfied, the new data node may be attributed to the same topology order and its topology status may be set to active. Conversely, if the condition is not satisfied, the new data node may be assigned an auto-increment topology order and its topology status may be set to active.

In scenarios where a data node needs to be terminated, topology deactivator 314 may initially deactivate the topology of that data node in inventory data store 312, after which, the inventory status of the deactivated topology in inventory data store 312 may be updated to terminated. The record may be maintained in the data store 312 for a predefined time period (e.g., 48 hours) until it is deleted by a tombstone workflow. During this time period, any attempt to re-add a data node with an identical domain name (e.g., a fully qualified domain name (FQDN)) can be rejected. This preventative measure, which involves keeping a record of a terminated data node, can mitigate the risk of inadvertently re-adding the wrong data node to the database, thereby avoiding a cascade of side effects, such as a corrupted topology snapshot and blockade of topology being pushed to the associated router nodes.

During generation of a topology payload by topology payload generator 316, topology payload generator 316 may review each topology order within the same host set. If an active topology status is observed in a data node, topology payload generator 316 may include the data node with the active topology status in the payload. However, if an active topology status is not observed in a data node, the most recently updated data node with an inactive topology status may be incorporated into the payload. This procedure ensures that at all times, the topology payload of any data cluster would remain valid, even amidst scaling or repairing operations.

In an embodiment, health monitor 318 monitors the health of the data nodes within a host set. If a data node needs to be terminated (e.g., data node is inactive or gets replaced), health monitor 318 may signal topology deactivator 314 to deactivate the topology of that node, as previously described.

Figure 4:
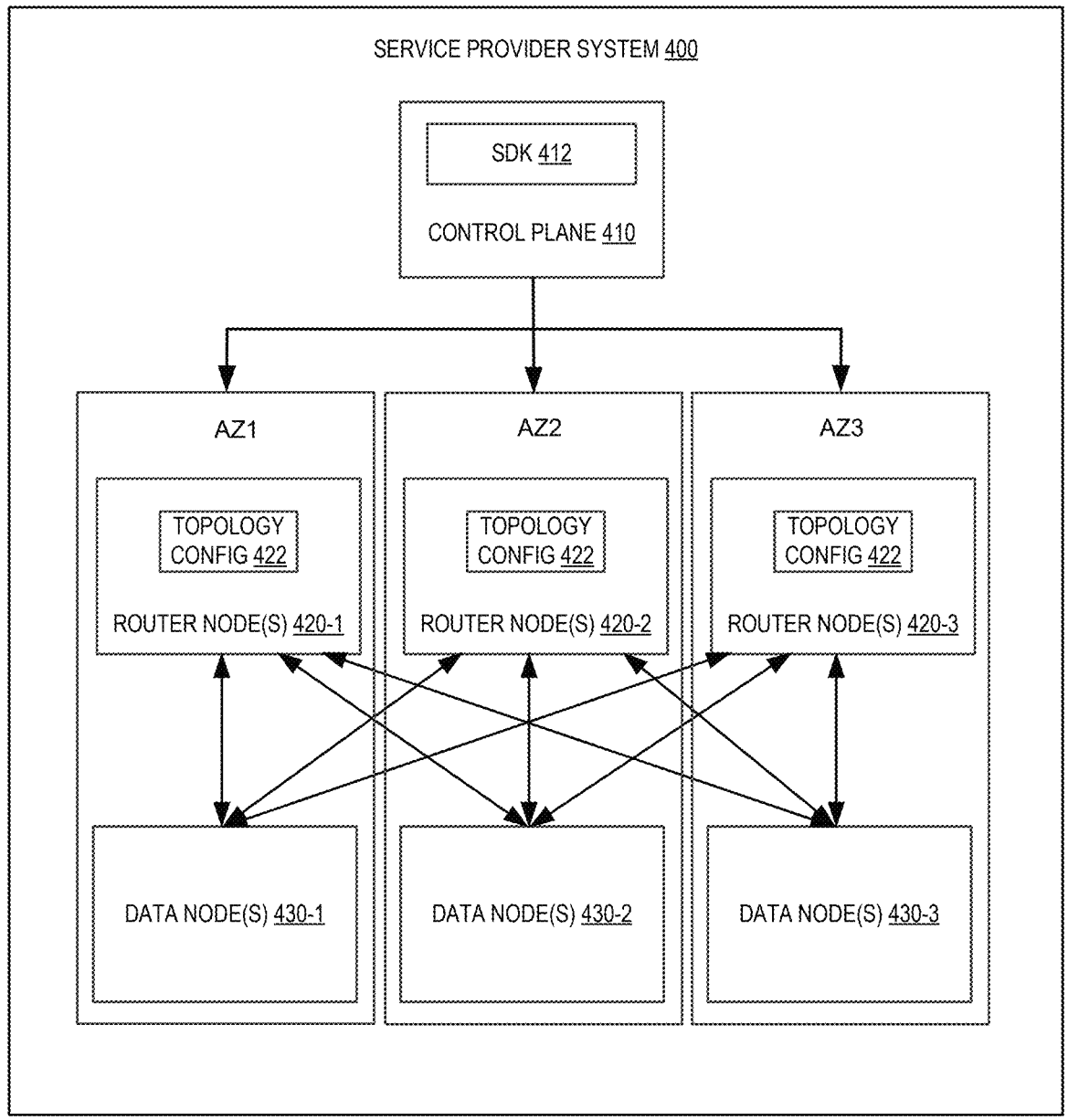
FIG. 4 is a block diagram of a synthetic workload test of a topology update workflow according to an embodiment.

FIG. 4 is a block diagram of a synthetic workload test of a topology update workflow according to an embodiment. In FIG. 4, service provider system 400 includes a control plane 410 and database clusters operating across availability zones AZ1-AZ3. Each availability zone may be an AWS AZ data center or sets of data centers within an AWS Region. Each AZ operates independently, so a failure in one does not affect others. AZs may also provide low-latency network connectivity to other AZs in the same AWS Region.

In embodiments, each of AZ1-AZ3 includes one or more router nodes (e.g., router nodes 420-1, 420-2, 420-3) and one or more data nodes (e.g., data nodes 430-1, 430-2, 430-3). Each router node(s) may include updated topology configuration 422 using topology configuration file 232 of FIG. 2, as previously described. For each service and/or end user, topology configuration 422 may include a set of IP addresses of the data nodes 430 where data is stored for that service/end user. Furthermore, the topology configuration 422 at each of the router nodes 420 may be the same to ensure consistent routing decisions among the routers. The set of IP addresses may be predefined, includes the number of data nodes used by the service/end user, and identifies each data node by IP address within a given ordering.

With continued reference to FIG. 4, control plane 410 may include a software development kit (SDK) client 412 (e.g., Memento™ GoSDK). SDK client 412 may be a set of data access functions that enable a service (e.g., worker service, control service, memcar service, memcached service, etc.) to read, write, or otherwise interact with data. SDK 412 may define one or more API function calls, such as set, get, post, put, delete, etc. that are used by the service when seeking to access data of the service. Such function calls may be part of a data access software library, such as that provided by the Memento™ distributed data storage system. SDK client 412 may be created by providing a router cluster namespace and a data cluster namespace of interest.

In running the synthetic workload test, SDK client 412 may send a set request to a data cluster of interest (e.g., data nodes 430-1, 430-2, 430-3) through its associated router cluster (e.g., router nodes 420-1, 420-2, 420-3) to send a key value pair to the data cluster. Upon receiving the set request, the data cluster may service the request by extracting the key value pair from the request and store the key value pair. In sending the set request, the SDK client 412 expects no error. Then, SDK client 412 may send a get request to the data cluster to retrieve the previously sent key value pair. The SDK client 412 may determine whether the previously sent key value pair can be retrieved successfully. If so, SDK client 412 may indicate that the synthetic workload test passes. Otherwise, SDK client 412 may indicate that the test fails. Subsequently, the SDK client 412 may send a delete request to the data cluster to delete the tested key value pair. The SDK client 412 expects no error in sending the delete request.

Figure 5:
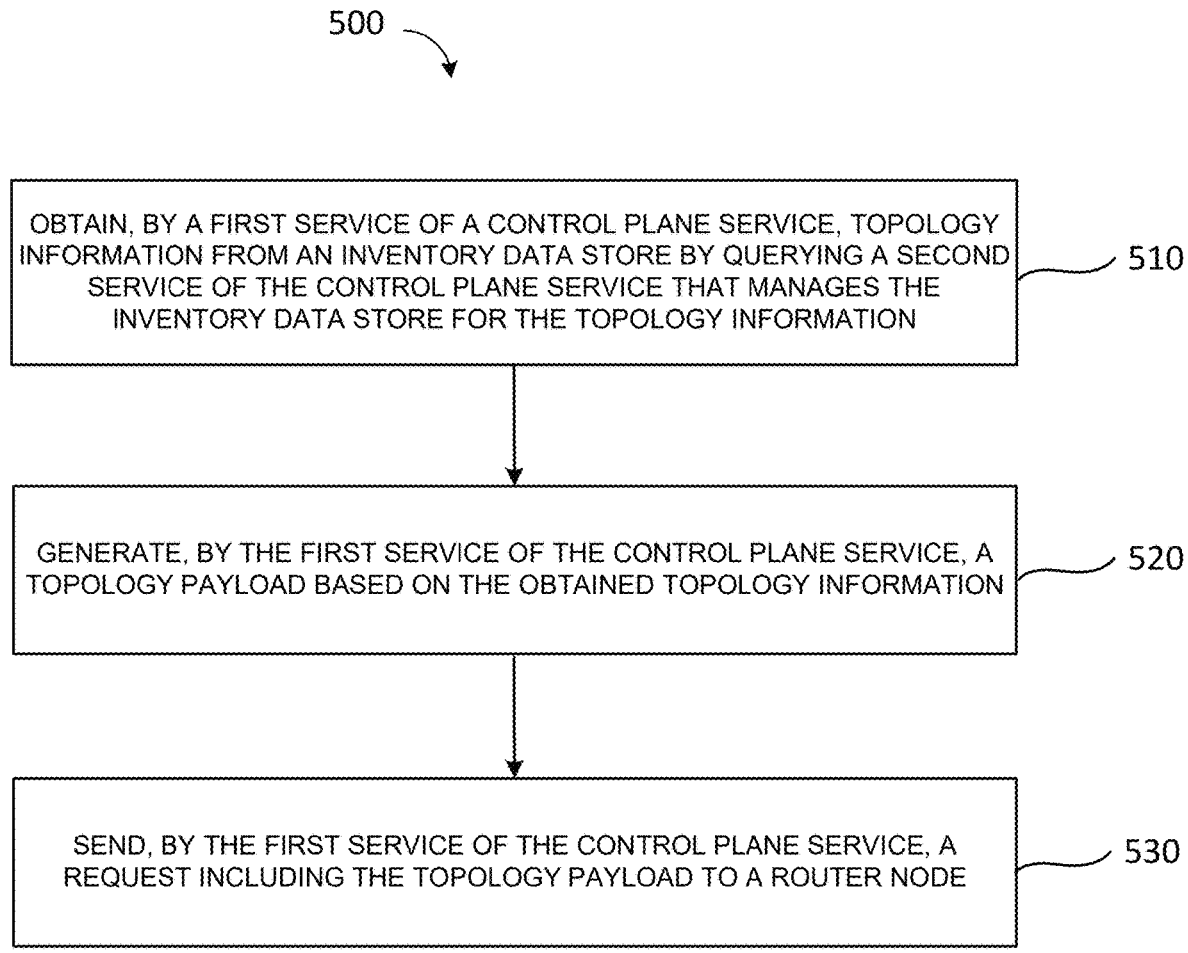
FIG. 5 is a flow diagram of a process for updating a topology on router nodes in a service provider system according to an embodiment.

FIG. 5 is a flow diagram of a process for updating a topology on router nodes in a service provider system according to an embodiment. Method 500 may be performed by processing logic that may comprise hardware (circuitry, dedicated logic, etc.), software (such as is run on a general purpose computer system or a dedicated machine), firmware, or a combination. In one embodiment, the method 500 is performed by a worker service and/or a control service of a control plane service (e.g., worker service 210 and/or control service 211).

Referring to FIG. 5, at block 510, the processing logic may obtain, by a first service of a control plane service, topology information from an inventory data store by querying a second service of the control plane service that manages the inventory data store for the topology information. For example, the first service (e.g., worker service 210) may fetch the most recent topology information from the inventory data store (e.g., inventory data store 212) by querying the second service (e.g., control service 211), which may serve as the frontend service of control plane service. The second service may have sole access to inventory data store, and thus, may have sole control in storing and managing the topology information.

At block 520, the processing logic may generate, by the first service of the control plane service, a topology payload based on the obtained topology information. For example, using the obtained topology information, the first service may construct and generate the topology payload that includes the topology information. The first service may also validate the structure and semantics of the payload. In an embodiment, the topology information that includes an association between a router cluster (e.g., router node(s) 203) and a data cluster (e.g., data node(s) 204), and topology-related information for each data node that includes a consistency mode, a caching read-write mode, an identifier for a primary instance, a topology order (e.g., a shard index), and/or a status of the topology (e.g., active or inactive). The association between the router cluster and the data cluster may include router identifiers of router nodes. The association may further include IP addresses, host names, host sets, etc. of data nodes associated with each router node.

At block 530, the processing logic may send, by the first service of the control plane service, a request (e.g., gRPC request) that includes the topology payload to a router node (e.g., router node 203).

Figure 6:
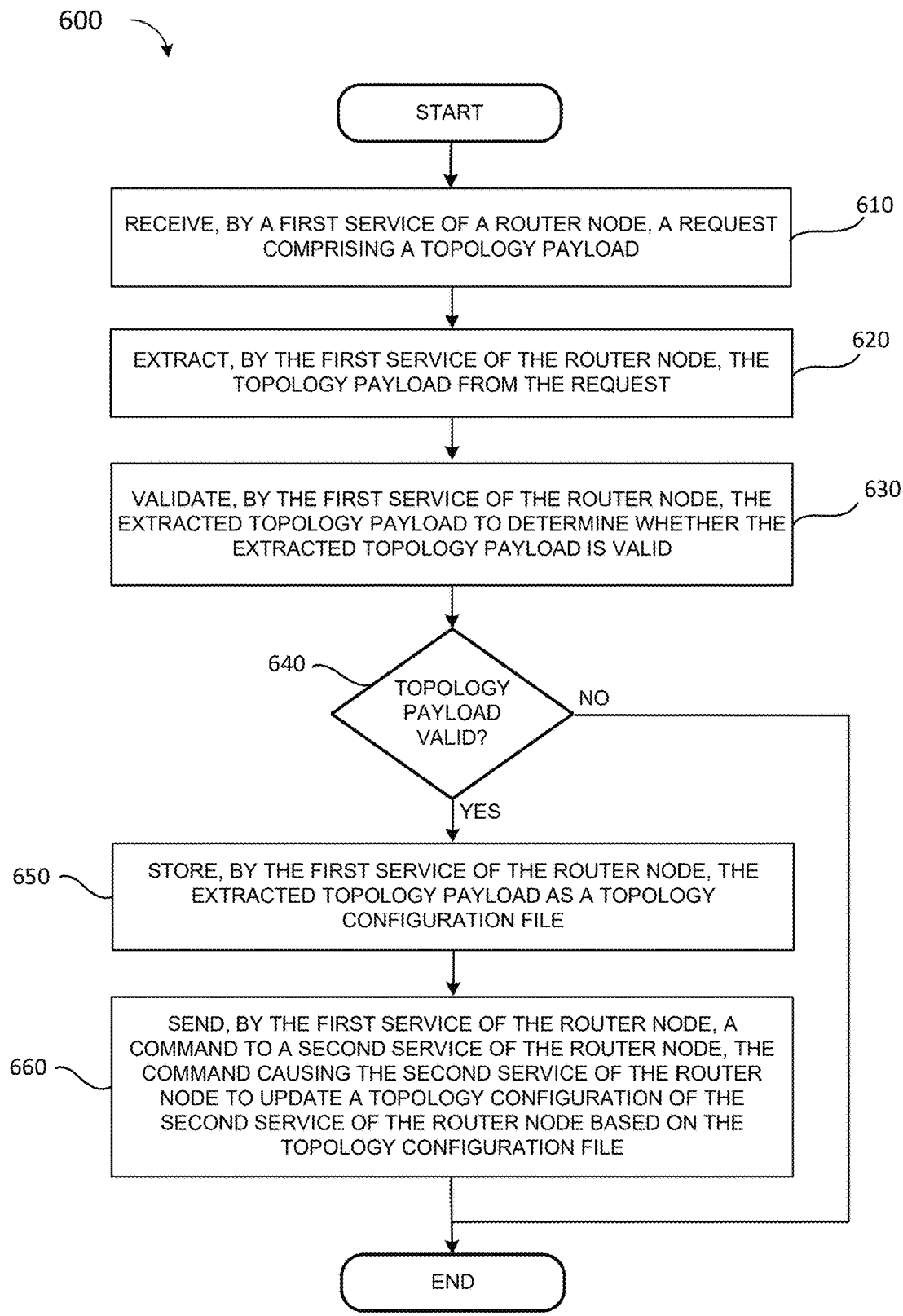
FIG. 6 is a flow diagram of another process for updating a topology on router nodes in the service provider system according to an embodiment.

FIG. 6 is a flow diagram of another process for updating a topology on router nodes in the service provider system according to an embodiment. Method 600 may be performed by processing logic that may comprise hardware (circuitry, dedicated logic, etc.), software (such as is run on a general purpose computer system or a dedicated machine), firmware, or a combination. In one embodiment, the method 600 is performed by a memcar service (e.g., memcar service 220) and/or a memcached service (e.g., memcached service 221) of a router node (e.g., router node 203).

Referring to FIG. 6, at block 610, the processing logic may receive, by a first service of a router node (e.g., memcar service 220), a request (e.g., gRPC request) that comprises a topology payload. At block 620, the processing logic may extract, by the first service of the router node, the topology payload from the request. In an embodiment, the topology payload includes the most recent topology information used to update the topology configuration of the router node.

At block 630, the processing logic may validate, by the first service of the router node, the extracted topology payload to determine whether the extracted payload is valid. At block 640, if it is determined that the topology payload is valid, the processing logic proceeds to block 650. Otherwise, the method 600 ends.

At block 650, the processing logic may store, by the first service of the router node, the extracted topology payload as a topology configuration file. For example, if it is determined that the extracted topology payload is valid, the first service may write the topology payload to a data storage (e.g., data storage 222) as the topology configuration file (e.g., configuration file 232). The topology configuration file may be in a format that a second service of the router node (e.g., memcached service 221) can effectively process.

At block 660, the processing logic may send, by the first service of the router node, a command (e.g., SIGHUP command) to the second service of the router node. The command can cause the second service of the router node to update a topology configuration of the second service of the router node based on the topology configuration file.

Figure 7:
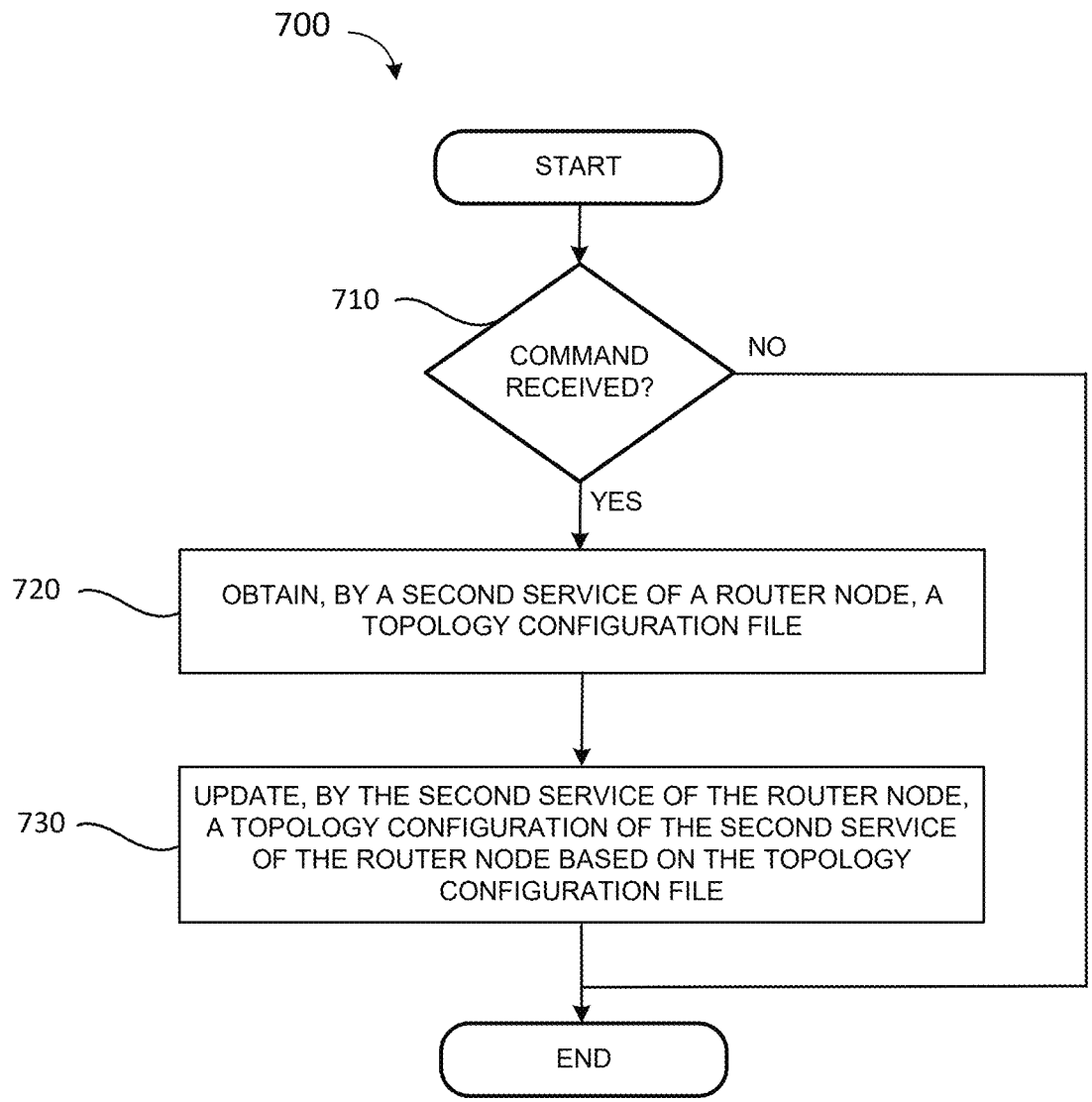
FIG. 7 is a flow diagram of yet another process for updating a topology on router nodes in the service provider system according to an embodiment.

FIG. 7 is a flow diagram of yet another process for updating a topology on router nodes in the service provider system according to an embodiment. Method 700 may be performed by processing logic that may comprise hardware (circuitry, dedicated logic, etc.), software (such as is run on a general purpose computer system or a dedicated machine), firmware, or a combination. In one embodiment, the method 700 is performed by a memcached service (e.g., memcached service 221) of a router node (e.g., router node 203).

Referring to FIG. 7, at block 710, the processing logic may determine whether a command was received. As previously described, the command (e.g., SIGHUP command) may be sent by a first service of a router node (e.g., memcar service 220). If it is determined that the command was received, the processing logic proceeds to block 720. Otherwise, the method 700 ends.

At block 720, the processing logic may obtain, by a second service of a router node, a topology configuration file. In an embodiment, the received command sent by the first service of the router node may cause or prompt the second service of the router node (e.g., memcached service 221) to read the topology configuration file from the data storage. At block 730, the processing logic may update, by the second service of the router node, a topology configuration of the second service of the router node based on the topology configuration file. For example, the second service of the router node may reload its current topology configuration to the new topology configuration from the topology configuration file.

Figure 8:
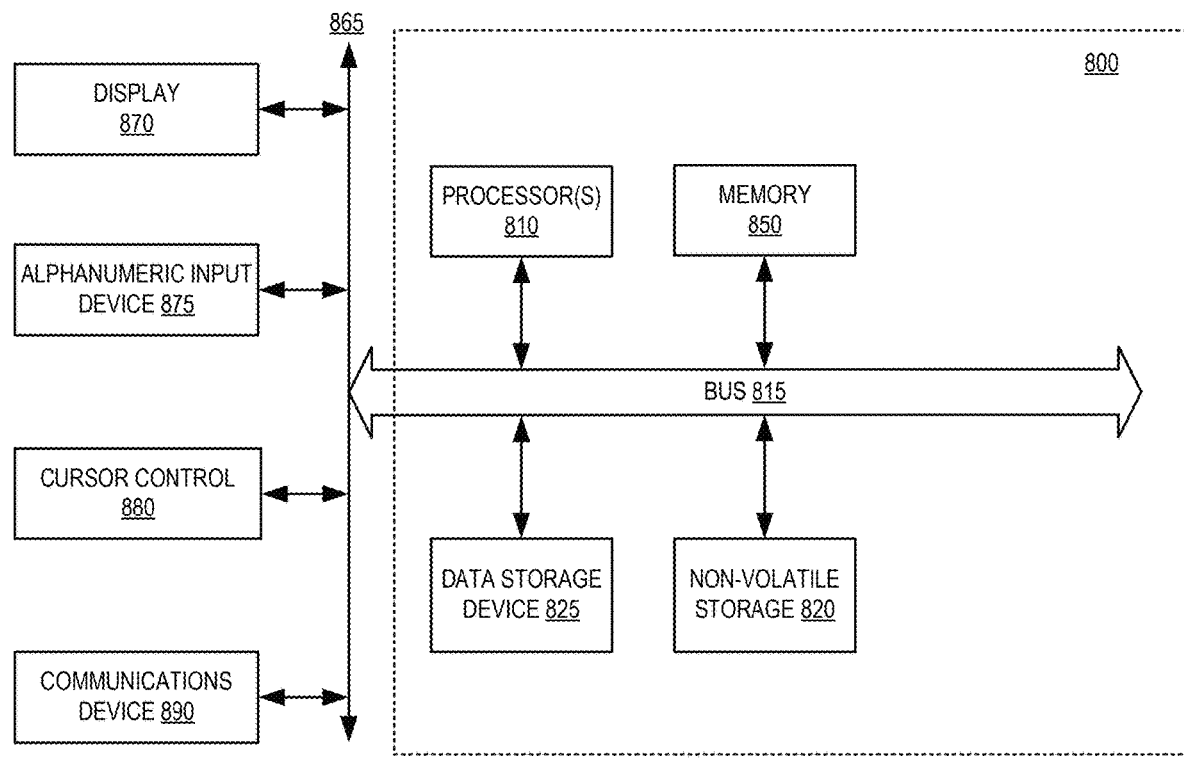
FIG. 8 is an embodiment of a computer system that may be used to support the systems and operations discussed herein.

FIG. 8 is an embodiment of a computer system that may be used to support the systems and operations discussed herein. The data processing system illustrated in FIG. 8 includes a bus or other internal communication means 815 for communicating information, and one or more processors 810 coupled to the bus 815 for processing information. The system further comprises a random access memory (RAM) or other volatile storage device 850 (referred to as memory), coupled to bus 815 for storing information and instructions to be executed by processor(s) 810. Main memory 850 also may be used for storing temporary variables or other intermediate information during execution of instructions by processor(s) 810. The system also comprises a read only memory (ROM) and/or static storage device 820 coupled to bus 815 for storing static information and instructions for processor(s) 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor(s) 810. An additional user input device is cursor control device 880, such as a touchpad, mouse, a trackball, stylus, or cursor direction keys coupled to bus 815 through bus 865 for communicating direction information and command selections to processor(s) 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read-only memory 820 and executed by processor(s) 810. This control logic or software may also be resident on an article of manufacture comprising a computer readable medium having computer readable program code embodied therein and being readable by the mass storage device 825 and for causing the processor(s) 810 to operate in accordance with the methods and teachings herein.

The embodiments discussed herein may also be embodied in a handheld or portable device containing a subset of the computer hardware components described above. For example, the handheld device may be configured to contain only the bus 815, the processor(s) 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include processor(s) 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A computer-implemented method for updating a topology on router nodes in a distributed storage system, the method comprising:
   obtaining, by a first service of a control plane service, topology information from an inventory data store by querying a second service of the control plane service that manages the inventory data store for the topology information;
   generating, by the first service of the control plane service, a topology payload based on the obtained topology information;
   sending, by the first service of the control plane service, a request comprising the topology payload to a router node;
   receiving, by a first service of the router node, the request comprising the topology payload;
   extracting, by the first service of the router node, the topology payload from the request;
   validating, by the first service of the router node, the extracted topology payload to determine whether the extracted topology payload is valid;
   determining, by the first service of the router node, that the extracted topology payload is valid;
   storing, by the first service of the router node, the extracted topology payload as a topology configuration file;
   sending, by the first service of the router node, a command to a second service of the router node, the command causing the second service of the router node to update a topology configuration of the second service of the router node based on the topology configuration file;
   sending, by the first service of the router node, a response to the first service of the control plane service, the response indicating a successful update of the topology configuration of the second service of the router node; and
   in response to receiving the response, initiating, by the first service of the control plane service, a workload test to validate an end-to-end data flow from the router node to one or more data storage nodes.

2. The method of claim 1, further comprising:
   in response to receiving the command, obtaining, by the second service of the router node, the topology configuration file; and
   updating, by the second service of the router node, the topology configuration of the second service of the router node based on the topology configuration file.

3. The method of claim 1, wherein the command is a signal hang up (SIGHUP) command.

4. The method of claim 1, wherein the response is a high-performance remote procedure call (gRPC) response.

5. The method of claim 1, wherein the topology information comprises an association between one or more router nodes and one or more data storage nodes and topology-related information associated with each of the one or more data storage nodes, the topology-related information comprising at least one of: a consistency mode, a caching read-write mode, an identifier for a primary instance, a topology order, or a status of a topology.

6. The method of claim 5, wherein the association between the one or more router nodes and the one or more data storage nodes is stored in a dedicated table having a topology version number.

7. The method of claim 1, wherein the request is a high-performance remote procedure call (gRPC) request.

8. One or more non-transitory computer readable storage media having instructions stored thereupon which, when executed by a system having at least a processor and a memory therein, cause the system to perform operations, the operations comprising:
   obtaining, by a first service of a control plane service, topology information from an inventory data store by querying a second service of the control plane service that manages the inventory data store for the topology information;
   generating, by the first service of the control plane service, a topology payload based on the obtained topology information;
   sending, by the first service of the control plane service, a request comprising the topology payload to a router node;
   receiving, by a first service of the router node, the request comprising the topology payload;
   extracting, by the first service of the router node, the topology payload from the request;
   validating, by the first service of the router node, the extracted topology payload to determine whether the extracted topology payload is valid;
   determining, by the first service of the router node, that the extracted topology payload is valid;
   storing, by the first service of the router node, the extracted topology payload as a topology configuration file;
   sending, by the first service of the router node, a command to a second service of the router node, the command causing the second service of the router node to update a topology configuration of the second service of the router node based on the topology configuration file;
   sending, by the first service of the router node, a response to the first service of the control plane service, the response indicating a successful update of the topology configuration of the second service of the router node; and
   in response to receiving the response, initiating, by the first service of the control plane service, a workload test to validate an end-to-end data flow from the router node to one or more data storage nodes.

9. The one or more non-transitory computer readable storage media of claim 8, wherein the operations further comprise:
   in response to receiving the command, obtaining, by the second service of the router node, the topology configuration file; and
   updating, by the second service of the router node, the topology configuration of the second service of the router node based on the topology configuration file.

10. The one or more non-transitory computer readable storage media of claim 8, wherein the command is a signal hang up (SIGHUP) command.

11. The one or more non-transitory computer readable storage media of claim 8, wherein the response is a high-performance remote procedure call (gRPC) response.

12. The one or more non-transitory computer readable storage media of claim 8, wherein the topology information comprises an association between one or more router nodes and one or more data storage nodes and topology-related information associated with each of the one or more data storage nodes, the topology-related information comprising at least one of: a consistency mode, a caching read-write mode, an identifier for a primary instance, a topology order, or a status of a topology.

13. The one or more non-transitory computer readable storage media of claim 12, wherein the association between the one or more router nodes and the one or more data storage nodes is stored in a dedicated table having a topology version number.

14. A computer node for managing a distributed storage system with a control plane, the computer node comprising:
   one or more processors; and
   a memory coupled to the one or more processors to store instructions, which when executed by the one or more processors, cause the one or more processors to:
      obtain, by a first service of a control plane service, topology information from an inventory data store by querying a second service of the control plane service that manages the inventory data store for the topology information;
      generate, by the first service of the control plane service, a topology payload based on the obtained topology information;
      send, by the first service of the control plane service, a request comprising the topology payload to a router node;
      receive, by a first service of the router node, the request comprising the topology payload;
      extract, by the first service of the router node, the topology payload from the request;
      validate, by the first service of the router node, the extracted topology payload to determine whether the extracted topology payload is valid;
      determine, by the first service of the router node, that the extracted topology payload is valid;
      store, by the first service of the router node, the extracted topology payload as a topology configuration file;
      send, by the first service of the router node, a command to a second service of the router node, the command causing the second service of the router node to update a topology configuration of the second service of the router node based on the topology configuration file;
      send, by the first service of the router node, a response to the first service of the control plane service, the response indicating a successful update of the topology configuration of the second service of the router node; and
      in response to receiving the response, initiate, by the first service of the control plane service, a workload test to validate an end-to-end data flow from the router node to one or more data storage nodes.

* * * * *